United States Patent Office 3,049,564
Patented Aug. 14, 1962

3,049,564
2-PHENYLBENZAMIDE DERIVATIVES AND
PROCEDURES FOR MAKING SAME
Wilson Shaw Waring, Macclesfield, England, assignor to Imperial Chemical Industries Limited, London, England, a corporation of Great Britain
No Drawing. Filed July 9, 1959, Ser. No. 825,872
Claims priority, application Great Britain July 23, 1958
3 Claims. (Cl. 260—558)

This invention relates to organic compounds and more particularly it relates to 2-phenylbenzamide derivatives which possess useful therapeutic properties, for example anticonvulsant properties.

According to the invention I provide 2-phenylbenzamide derivatives of the formula:

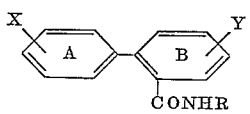

wherein R stands for hydrogen or for a hydrocarbon, acyl or carbamyl radical, wherein X and Y stand for hydrogen, or for one or more halogen atoms or cyano radicals, and wherein the benzene rings A and/or B may optionally contain additional substituents, provided that R does not stand for hydrogen when X and Y both stand for hydrogen, and R and Y do not both stand for hydrogen when X stands for a p-chloro-substituent.

As suitable hydrocarbon radicals there may be mentioned, for example, lower alkyl radicals, for example the methyl, ethyl, n- or iso-propyl, or n- or iso-butyl radical, alkenyl radicals, for example the allyl radical, aralkyl radicals, for example the benzyl radical, and suitable acyl radicals may be, for example, the acetyl or butyryl radical. Additional substituents in the benzene ring may, for example, be selected from the group consisting of lower alkyl radicals and lower alkoxy radicals.

According to a preferred feature of the invention we provide 2-phenylbenbzamide derivatives of the formula:

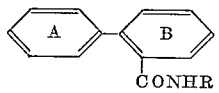

wherein R stands for hydrogen or for a hydrocarbon, acyl or carbamyl radical, wherein ring A and/or ring B contain or contains one or more halogeno-substituents, and wherein rings A and B may optionally contain additional substituents, provided that, when ring A contains a p-chloro-substituent, either R does not stand for hydrogen or one or more additional substituents are present in ring A and/or in ring B.

As particularly useful 2-phenylbenzamide derivatives there may be mentioned for example, 2-phenyl-N-methyl-benzamide, 2-phenyl-N-n-butylbenzamide, 2-phenyl-N-isobutylbenzamide, 2-phenyl-N-allylbenzamide, 2-phenyl-N-benzylbenzamide, 2 - phenyl - N - acetylbenzamide, 2-phenyl-N-n-butyrylbenzamide, N-(2-phenylbenzoyl)urea, 2-(p-bromophenyl)-5-bromobenzamide, 2 - (p - bromo-phenyl)-5-bromo - N - methylbenzamide, 2 - (p - chloro-phenyl) - 5 - chlorobenzamide, 2(p - chlorophenyl) - 5-chloro - N - methylbenzamide, 2 - (p - chlorophenyl) - 5-chloro - N - ethylbenzamide, 2 - (p - chlorophenyl) - 5-chloro - N - n - propylbenzamide, 2 - (p - chlorophenyl)-5-chloro-N-isopropylbenzamide, 2 - (p - fluorophenyl) - 5-fluorobenzamide, 2-(p-bromophenyl)-5-chlorobenzamide, 2 - (p - chlorophenyl) - 5 - bromobenzamide, - 2 - (m-chlorophenyl) - 4 - chlorobenzamide, 2 - (2':5' - dichloro-phenyl)benzamide, 2 -phenyl - 5 - fluorobenzamide, 2-phenyl-5-chlorobenzamide, 2-phenyl-4-chlorobenzamide, 2-(o-cyanophenyl)banzamide, 2-(o - iodophenyl) - benz-amide, 2(p-fluorophenyl)benzamide, 2-(p-bromophenyl)-benzamide, 2 - (p - bromophenyl) - N - methylbenzamide, 2 - ( p - bromophenyl) - N - acetylbenzamide, 2 - (p-iodophenyl) - benzamide, 2 - (o-chlorophenyl)benzamide monohydrate, 2-(o-bromophenyl)benzamide and 2-(o-chlorophenyl)-5-bromobenzamide and of these, preferred compounds are 2-(p-bromophenyl)-5-bromobenzamide and 2-(p-bromophenyl)-5-chlorobenzamide.

According to a further feature of the invention I provide a process for the manufacture of the said 2-phenylbenzamide derivatives which comprises interaction of a 2-phenylbenzoic acid derivative of the formula:

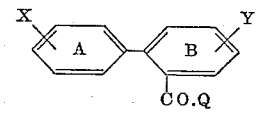

wherein X and Y have the meaning stated above and wherein Q stands for a halogen atom, for example a chlorine atom, or an alkoxy radical, with an amino-compound of the formula R.NH$_2$ wherein R has the meaning stated above.

As suitable amino compounds of the above stated formula there may be mentioned, for example, ammonia, methylamine, n- and iso-propylamine, n- and iso-butylamine, allylamine, benzylamine and urea. The process may be carried out in the presence of an inert diluent or solvent, for example benzene.

The acid halides or esters used as starting materials may be obtained by known means, for example the acid chlorides may be obtained by reaction of the corresponding acids with phosphorus pentachloride and/or phosphorus oxychloride, or with thionyl chloride.

According to a further feature of the invention we provide a process for the manufacture of 2-phenylbenzamide derivatives of the formula:

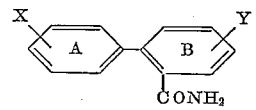

wherein X and Y have the meaning stated above which comprises hydrolysis of a 2-phenylbenzonitrile derivative of the formula:

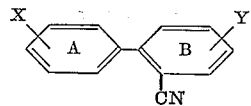

wherein X and Y have the meaning stated above.

The said hydrolysis may be effected according to the known art, for example by reaction with an acid, for example 90% sulphuric acid, or with alkaline hydrogen peroxide.

According to a further feature of the invention we provide a process for the manufacture of 2-phenylbenzamide derivatives of the formula:

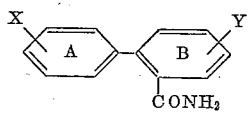

wherein X and Y have the meaning stated above, which comprises heating a salt of a derivative of 2-phenyl-benzoic acid of the formula:

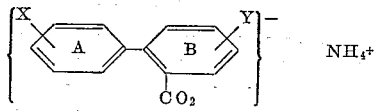

wherein X and Y have the meaning stated above.

According to a further feature of the invention I provide a process for the manufacture of 2-phenylbenzamide derivatives of the formula:

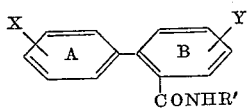

wherein R' stands for an acyl radical and X and Y have the meaning stated above, which comprises interaction of a 2-phenylbenzoic acid derivative of the formula:

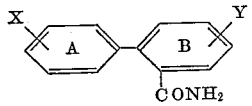

wherein X and Y have the meaning stated above, with an acylating agent, leading to introduction of the acyl substituent (R').

As suitable acylating agents there may be mentioned, for example, acetyl chloride and n-butyryl chloride. The process may be accelerated or completed by the application of heat and there may be present an excess of the acylating agent to act as a solvent or diluent.

The invention is illustrated, but not limited by the following examples in which the parts are by weight:

Example 1

25 parts of 2-phenylbenzoic acid and 29 parts of phosphorus pentachloride are intimately mixed in a mortar. The reaction mixture is diluted with 300 parts of benzene and the mixture is then filtered. The filtrate, which consists of a solution of 2-phenylbenzoyl chloride in benzene, is cooled and saturated with dry methylamine gas. The resulting mixture is filtered and the solid residue is washed with water and crystallised from ethanol. There is thus obtained 2-phenyl-N-methylbenzamide, M.P. 167–168° C.

Example 2

To a cooled solution of 5 parts of 2-phenylbenzoyl chloride in 60 parts of benzene, prepared as described in Example 1, are added 20 parts of n-butylamine. The solvent is removed by distillation under reduced pressure and water is added to the residue. The resulting mixture is filtered and the solid residue is washed with water and crystallised from petroleum ether (B.P. 60–80° C.). There is thus obtained 2-phenyl-N-n-butylbenzamide, M.P. 68–69° C.

Example 3

The procedure described in Example 2 is repeated except that the 20 parts of n-butylamine are replaced by 20 parts of isobutylamine. There is thus obtained in a similar manner 2-phenyl-N-isobutylbenzamide, M.P. 108–109° C. (from petroleum ether B.P. 60–80° C.).

Example 4

The procedure described in Example 2 is repeated except that the 20 parts of n-butylamine are replaced by 20 parts of allylamine. There is thus obtained in a similar manner 2-phenyl-N-allylbenzamide, which, after crystallisation from petroleum ether (B.P. 68–80° C.) has M.P. 78–79° C.

Example 5

The procedure described in Example 2 is repeated except that the 20 parts of n-butylamine are replaced by 20 parts of benzylamine. There is thus obtained in a similar manner 2-phenyl-N-benzylbenzamide, which, after crystallisation from benzene, has M.P. 96–97° C.

Example 6

3 parts of 2-phenylbenzamide and 30 parts of acetyl chloride are heated under reflux during 8 hours. The reaction mixture is then evaporated to dryness under reduced pressure and the residue is cooled and triturated with petroleum ether (B.P. 40–60° C.). The resulting mixture is filtered and the solid residue is crystallised from petroleum ether (B.P. 80–100° C.). There is thus obtained 2-phenyl-N-acetylbenzamide, M.P. 112–113° C.

Example 7

The procedure described in Example 4 is repeated except that the 30 parts of acetyl chloride are replaced by 4 parts of n-butyryl chloride. The solid residue is crystallised from benzene and there is thus obtained 2-phenyl-N-n-butyrylbenzamide, M.P. 103–104° C.

Example 8

A mixture of 2 parts of urea and 3.6 parts of 2-phenylbenzoyl chloride in 20 parts of benzene is heated under reflux during 5 hours. The reaction mixture is cooled and filtered and the solid residue is washed with benzene and triturated three times with water. The resulting mixture is filtered and the solid residue is crystallised from ethanol. There is thus obtained N-(2-phenylbenzoyl) urea, M.P. 214–215° C.

Example 9

2.5 parts of 2-(p-bromophenyl)-5-bromobenzoic acid and 1.25 parts of phosphorus pentachloride are intimately mixed and 1.5 parts of phosphorus oxychloride are added. After 15 minutes, 50 parts of benzene are added to the reaction mixture and the mixture is filtered. The filtrate is saturated with dry ammonia gas and the resulting mixture is filtered. The solid residue is washed with water and is then crystallised from ethanol. There is thus obtained 2-(p-bromophenyl)-5-bromobenzamide, M.P. 245–246° C.

Example 10

The process described in Example 9 is repeated except that the ammonia gas is replaced by methylamine. The benzene is removed from the reaction mixture by distillation and the residue is washed with water and re-crystallised from ethanol, giving 2-(p-bromophenyl)-5-bromo-N-methylbenzamide as colourless needles, M.P. 209–210° C.

Example 11

10 parts of phosphorus oxychloride are added to a mixture of 6 parts of 2-(p-chlorophenyl)-5-chlorobenzoic acid and 10 parts of phosphorus pentachloride. When the reaction has subsided, the mixture is heated on a steam bath during 15 minutes. The phosphorus oxychloride is removed by distillation under reduced pressure and the residue is dissolved in 250 parts of benzene. The benzene solution is cooled and treated with dry ammonia gas according to the process described in Example 9 and is then filtered. The solid residue is washed with water and is then crystallized from methanol. There is thus obtained 2-(p-chlorophenyl)-5-chlorobenzamide, M.P. 216–217° C.

The 2-(p-chlorophenyl) 5-chlorobenzoic acid used as starting material in the above process may be prepared by adding 20 parts of 2:7-dichlorofluorenone during 30 minutes to 55 parts of potassium hydroxide and 1 part of water at 220° C. with stirring. After the addition is complete, the mixture is cooled, dissolved in water and most of the alkali is neutralised by the addition of concentrated hydrochloric acid. The resulting mixture is filtered, the filtrate is acidified with hydrochloric acid and the mixture so obtained is filtered. The solid residue is dried and extracted with hot benzene. The benzene extracts are allowed to cool and the resulting mixture is filtered. There is thus obtained 2-(p-chlorophenyl)-5-chlorobenzoic acid, M.P. 187–188° C.

Example 12

8 parts of 30% hydrogen peroxide (100 vol.) are added to a solution of 4.96 parts of 2-(p-chlorophenyl)-5-chlorobenzonitrile in 250 parts of ethanol containing 0.4 part of concentrated aqueous sodium hydroxide at room temperature. The mixture is heated to 50° C. and maintained at this temperature for 1.5 hours. The mixture is poured into 2000 parts of water, the mixture filtered and the solid residue is re-crystallised from ethanol giving 2-(p-chlorophenyl)-5-chlorobenzamide as colourless needles, M.P. 216–217° C.

The 2-(p-chlorophenyl)-5-chclorobenzonitrile used in the above procedure may be obtained as follows:

23.8 parts of 2-(p-chlorophenyl)-5-chloroaniline is dissolved in 50 parts of glacial acetic acid and the solution is added to a solution of 7.5 parts of sodium nitrite in 50 parts of concentrated sulphuric acid, keeping the temperature below 20° C. The mixture is poured onto 200 parts of ice and 250 parts of water and 150 parts of sodium carbonate are added while maintaining the temperature below 5° C. This mixture is added to a cooled, stirred solution of cuprous cyanide prepared as follows: 62.5 parts of copper sulphate crystals and 16.25 parts of sodium chloride are dissolved in 200 parts of hot water, and a solution of 16 parts of sodium sulphite and 3.75 parts of sodium hydroxide in 100 parts of water is added with stirring. The mixture is cooled, the solid is washed twice by decantation, suspened in 100 parts of water and dissolved in a solution of 32.5 parts of sodium cyanide in 50 parts of water, and 50 parts of toluene are added. The reaction mixture of the diazonium salt and cuprous cyanide solution is allowed to stand at room temperature for 24 hours, filtered, and the solid residue is recrystallised from ethanol giving 2-(p-chlorophenyl)-5-chlorobenzonitrile, M.P. 137–138° C.

Example 13

A mixture of 1.24 parts of 2-(p-chlorophenyl)-5-chlorobenzoic acid, 5 parts of phosphorus oxychloride and 1 part phosphorus pentachloride is heated at 100° C. for 3 hours. The phosphorus oxychloride is distilled off under reduced pressure and the residue is dissolved in 20 parts of benzene. Exces aqueous 30% methylamine solution is added with cooling, whereafter the benzene layer is separated, washed with warm 10% sodium hydroxide solution, then with water and dried. The solvent is removed by distillation and the residual solid is crystallized from benzene giving 2-(chlorophenyl)-5-chloro-N-methylbenzamide, M.P. 179–180° C.

The 2-(p-chlorophenyl)-5-chlorobenzoic acid used in the above procedure may be obtained by heating a mixture of 2.48 parts of 2-(p-chlorophenyl)-5-chlorobenzonitrile, 50 parts of ethanol and 10 parts of concentrated aqueous sodium hydroxide for 24 hours under reflux. The mixture is then cooled, acidified with hydrochloric acid, filtered, and the solid residue is crystallized from benzene, giving 2-(p-chlorophenyl)-5-chlorobenzoic acid, M.P. 188 C.

Example 14

A solution of 1.5 parts of 2-(p-chlorophenyl)-5-chlorobenzoyl chloride in 20 parts of benzene is mixed with excess of an aqueous solution of ethylamine with shaking. The benzene layer is separated, washed with warm 10% sodium hydroxide solution, then with water, and the solvent is then removed by distillation. The solid residue is crystallised from benzene giving 2-(p-chlorophenyl)-5-chloro-N-ethylbenzamide, M.P. 164° C.

The 2-(p-chlorophenyl)-5-chlorobenzoyl chloride used in the above procedure may be obtained by heating 3 parts of 2-(p-chlorophenyl)-5-chlorobenzoic acid and 15 parts of thionyl chloride under reflux for 2 hours. The excess thionyl chloride is removed by distillation and the residue is crystallised from benzene giving 2-(p-chlorophenyl)-5-chlorobenzoyl chloride, M.P. 92–93° C.

Example 15

The procedure described in Example 14 is repeated except that the ethylamine is replaced by n-propylamine. There is thus obtained in a similar manner 2-(p-chlorophenyl)-5-chloro-N-n-propylbenzamide, M.P. 150–151° C., after crystallisation from benzene.

Example 16

The procedure described in Example 14 is repeated except that the ethylamine is replaced by isopropylamine. There is thus obtained in a similar manner 2-(p-chlorophenyl) - 5 - chloro - N - isopropylbenzamide, M.P. 165–166° C., after crystallisation from benzene.

Example 17

1.2 parts of 2-(p-fluorophenyl)-5-fluorobenzoic acid, 1.5 parts of phosphorus pentachloride and 0.5 part of phosphorus oxychloride are mixed and, when the reaction has subsided, the mixture is heated at 100° C. for 15 minutes, whereafter the excess phosphorus oxychloride is removed by distillation under reduced pressure. The residue is dissolved in petroleum ether (B.P. 60–80° C.), the solution filtered, the filtrate cooled and dry ammonia gas passed into it. The resulting mixture is filtered and the solid residue is washed with water and crystallised from aqueous methanol, giving 2-(p-fluorophenyl)-5-fluorobenzamide, as colourless needles, M.P. 133–134° C.

The 2-(p-fluorophenyl)-5-fluorobenzoic acid used in the above procedure may be obtained by heating a mixture of 1.5 parts of 2-(p-fluorophenyl)-5-fluorobenzonitrile, 15 parts of ethanol and a solution of 2 parts of sodium hydroxide in 5 parts of water under reflux for 24 hours. The ethanol is removed by distillation and the residue is then dissolved in water and the aqueous solution so obtained is extracted with chloroform. The aqueous solution is then acidified with hydrochloric acid, filtered, and the solid residue is crystallised from aqueous methanol giving 2-(p-fluorophenyl)-5-fluorobenzoic acid, M.P. 120–121° C.

The 2-(p-fluorophenyl)-5-fluorobenzonitrile used in the above procedure may be obtained as follows:

A solution of 10 parts of 2-(p-fluorophenyl)-5-fluoroaniline in 25 parts of glacial acetic acid is added to a solution of 3.75 parts of sodium nitrite in 25 parts of concentrated sulphuric acid with stirring while maintaining the temperature below 20° C. After 30 minutes the mixture is poured onto ice, neutralised with 65 parts of sodium carbonate and added to a mixture of a solution of 12.5 parts of copper sulphate in 50 parts of water, a solution of 10.25 parts of sodium cyanide in 50 parts of water, and 50 parts of toluene. The mixture is stirred for 24 hours at room temperature and is then heated at 90° C. for 1 hour, cooled and extracted with benzene. The benzene extract is dried over sodium sulphate, the solvent removed by distillation, the residue washed with petroleum ether (B.P. 40–60° C.) and purified by crystallisation from ethanol or by vacuum sublimation, giving 2-(p-fluorophenyl)-5-fluorobenzonitrile as cream coloured crystals, M.P. 121–122° C.

Example 18

A mixture of 1.8 parts of 2-(p-bromophenyl)-5-chlorobenzoic acid, 2.5 parts of phosphorus pentachloride and 0.5 part of phosphorus oxychloride are allowed to react at room temperature, and, when the spontaneous reaction is over, the mixture is heated at 90° C. for 5 minutes. The phosphorus oxychloride is removed by distillation under reduced pressure and the residue is dissolved in petroleum ether (B.P. 60–80° C.). The solution is cooled and dry ammonia gas is passed through it. The mixture is then filtered and the solid residue is washed with water and crystallised from methanol giving 2-(p-bromophenyl)-5-chlorobenzamide as pale yellow needles, M.P. 224–225° C.

The 2-(p-bromophenyl)-5-chlorobenzoic acid used in the above procedure may be obtained by heating 4 parts of 2-phenyl-5-chlorobenzoic acid, 20 parts of glacial acetic acid, 1.5 parts of bromine and a crystal of iodine at 100° C. for 24 hours. The solution is concentrated to half volume by distillation under reduced pressure and the mixture is then filtered. The residue is washed with water and re-crystallised from benzene giving 2-(-p-bromophenyl)-5-chlorbenzoic acid, M.P. 206–207° C.

Example 19

A mixture of 1.7 parts of 2-(p-chlorophenyl)-5-bromobenzoic acid, 1.7 parts of phosphorus pentachloride and 20 parts of dry benzene is heated at 100° C. for 5 minutes. The mixture is then cooled and diluted with 100 parts of dry ether, and ammonia gas is passed into the solution until no more solid is precipitated. The mixture is filtered, the solid washed with water and crystallised from ethanol giving 2-(p-chlorophenyl)-5-bromobenzamide, M.P. 232–234° C.

The 2-(p-chlorophenyl)-5-bromobenzoic acid used in the above procedure may be obtained by stirring and heating a mixture of 6.9 parts of methyl 2-(p-chlorophenyl)-5-bromobenzoate, 50 parts of sodium hydroxide (10 N) and 50 parts of water under reflux for 17 hours. The mixture is diluted with water, filtered, and the filtrate is acidified with hydrochloric acid and filtered. The solid is crystallised from aqueous ethanol giving 2-(p-chlorophenyl)-5-bromobenzoic acid, M.P. 194–197° C.

The methyl 2-(p-chlorophenyl)-5-bromobenzoate used as starting material may be obtained by passing chlorine into a solution of 10 parts of methyl 2-phenyl-5-bromobenzoate in 40 parts of glacial acetic acid at 90–100° C. for 5 hours. The mixture is cooled and diluted with benzene and the benzene solution is washed and dried over magnesium sulphate. The solvent is removed by distillation and the residue is distilled giving methyl 2-(p-chlorophenyl)-5- bromobenzoate as a yellow, viscous oil, B.P. 150–160° C./0.2 mm.

Example 20

1.9 parts of 2-(m-chlorophenyl)-4-chlorobenzoic acid, 1.9 parts of phosphorus pentachloride and 15 parts of dry benzene are heated at 100° C. for 10 minutes. The mixture is then cooled and diluted with 50 parts of dry ether. Dry ammonia gas is passed into the cooled ethereal solution until the ethereal solution is alkaline to litmus. The solution is washed with water, dried over magnesium sulphate and the solvent removed. The residue is crystallised from aqueous ethanol giving 2-(m-chlorophenyl)-4-chlorobenzamide, M.P. 145–146° C.

Example 21

2 parts of 2-(2':5'-dichlorophenyl)benzoic acid, 2 parts of phosphorous pentachloride and 2 parts of dry benzene are heated at 100° C. for 10 minutes. The clear solution is dissolved in petroleum ether (B.P. 60–80° C.) and cooled, and dry ammonia gas is passed into the solution until precipitation is complete. The mixture is filtered and the solid residue is washed with water and crystallised from aqueous ethanol, giving 2-(2':5'-dichlorophenyl)benzamide as colourless prisms, M.P. 120–121° C.

The 2-(2':5'-dichlorophenyl)benzoic acid used in the above procedure may be obtained by adding 18 parts of copper bronze to a stirred mixture of 54 parts of 2:4-dichloroiodobenzene and 25 parts of methyl o-iodobenzoate over 5 minutes at 260° C., whereafter stirring and heating at 260° C. are continued for 1 hour. Another 25 parts of methyl o-iodobenzoate and 10 parts of copper bronze are added and the temperature of the mixture is maintained at 260° C. The mixture is cooled, extracted with benzene and the solvent is then removed by distillation. The solid residue is purified by fractional distillation under reduced pressure, the fraction of B.P. 120–200° C./0.2 mm. being collected. A mixture consisting of the fraction of B.P. 120–200° C./0.2 mm. (35 parts), 60 parts of concentrated aqueous sodium hydroxide and 150 parts of ethanol is heated under reflux for 12 hours. The ethanol is then removed by distillation and the residue is dissolved in water and the solution extracted with benzene. The aqueous solution is then made acid to litmus with acetic acid and filtered whereafter the solid residue is crystallised from benzene giving 2-(2':5'-dichlorophenyl)benzoic acid as colourless prisms, M.P. 152–153° C.

Example 22

A suspension of 1 part of 2-phenyl-5-fluorobenzoic acid and 1 part of phosphorus pentachloride in 25 parts of dry benzene is heated at 100° C. for 3 minutes. The mixture is cooled, diluted with 100 parts of dry ether and dry ammonia gas is passed in until the solution is saturated with ammonia. The mixture is filtered and the solid residue is extracted with water. The residual oil is extracted with chloroform, the chloroform solution is dried over sodium sulphate and the solvent is removed by distillation. The residue is crystallised from aqueous ethanol giving 2-phenyl-5-fluorobenzamide, M.P. 192–193° C.

The 2-phenyl-5-fluorobenzoic acid used in the above procedure may be obtained by heating dry methyl 2-phenylbenzoate 5-diazonium borofluoride in a wide-necked flask and steam-distilling the oily residue so obtained. The steam-distillate is extracted with ether and the ether is removed by distillation. The residue is hydrolysed by heating with excess sodium hydroxide in 50% aqueous ethanol under reflux for 2 hours. The mixture is cooled and filtered, and the filtrate is then acidified with hydrochloric acid and filtered. The solid residue is 2-phenyl-5-fluorobenzoic acid, M.P. 90–95° C., which may be used for the preparation of the corresponding amide without further purification.

The methyl 2-phenylbenzoate 5-diazonium borofluoride used in the above procedure is obtained by diazotisation of 3.9 parts of methyl 2-phenyl-5-aminobenzoate dissolved in 5 parts of concentrated hydrochloric acid and 5 parts of water, by adding 1.4 parts of sodium nitrite in 3 parts of water, and adding the mixture to 7 parts of sodium borofluoride in 10 parts of water. The mixture is filtered and the residue is washed successively with ice-cold water, methanol and ether and then dried in vacuo over concentrated sulphuric acid at room temperature. There is thus obtained methyl 2-phenylbenzoate 5-diazonium borofluoride, M.P. 130–132° C. with decomposition.

The methyl 2-phenyl-5-aminobenozate used in the above procedure may be obtained by shaking a solution of 5 parts of methyl 2-phenyl-5-nitrobenzoate in 100 parts of methanol in an atmosphere of hydrogen in the presence of 0.5 part of Adams' catalyst at atmospheric pressure and room temperature. When the theoretical quantity of hydrogen required for reduction of one nitro group to an amino group has been absorbed, the mixture is filtered and the solvent is removed by distillation. The residue is crystallised from petroleum ether (B.P. 80–100° C.) giving methyl 2-phenyl-5-aminobenzoate, M.P. 96–97° C.

Example 23

1.5 parts of 2-phenyl-5-chlorobenzoic acid and 1.5 parts of phosphorus pentachloride are intimately mixed and when the spontaneous reaction is over the liquid mixture is dissolved in benzene and the solution is saturated with gaseous ammonia. The mixture is filtered and the solid is washed with water and crystallised from methanol giving 2-phenyl-5-chlorobenzamide, M.P. 172–173° C.

Example 24

1.5 parts of 2-phenyl-4-chlorobenzoic acid and 1.5 parts of phosphorus pentachloride are mixed and the mixture is allowed to stand for 10 minutes after the initial reaction is over. The mixture is dissolved in petroleum ether (B.P. 60–80° C.), and the solution is then saturated with gaseous ammonia and filtered. The solid residue is washed with water and crystallised from aqueous methanol, giving 2-phenyl-4-chlorobenzamide as colourless needles, M.P. 164–165° C.

Example 25

A solution of 5 parts of 2-(o-cyanophenyl)benzoyl chloride in 25 parts of dry ether is saturated with dry gaseous ammonia and the mixture is then filtered. The solid residue is washed with water and crystallised from methanol, giving 2-(o-cyanophenyl)benzamide, M.P. 150–151° C.

*Example 26*

A suspension of 1.3 parts of 2-(o-iodophenyl)benzoic acid and 1.5 parts of phosphorus pentachloride in 5 parts of dry benzene is allowed to stand at room temperature until all the acid has dissolved. The mixture is then warmed at 100° C. for 2 minutes, cooled, and diluted with dry ether. Dry gaseous ammonia is passed in until the solution is alkaline and the solution is then filtered. The filtrate is evaporated to dryness under reduced pressure and the residual oil is extracted with water and the mixture filtered. The solid residue is dried at room temperature and then crystallised from benzene giving 2-(o-iodophenyl)benzamide, M.P. 102–103° C.

*Example 27*

A mixture of 1 part of 2-(p-fluorophenyl)benzonitrile, 50 parts of ethanol, 0.4 part of concentrated aqueous sodium hydroxide and 16 parts of hydrogen peroxide (100 vol.) is heated at 50° C. for 30 minutes, left at room temperature for 2 days, and finally heated under reflux for 1 hour. The mixture is poured into water, the mixture filtered and the solid residue crystallised from ethanol giving 2-(p-fluorophenyl)benzamide, M.P. 164–165° C.

The 2-(p-fluorophenyl)benzonitrile used in the above procedure may be obtained as follows:

1.5 parts of 2-(p-fluorophenyl)aniline is dissolved by warming in a mixture of 2.3 parts concentrated hydrochloric acid and 23 parts of water and the solution is cooled to 3° C. and diazotised by adding 0.6 part of sodium nitrite, while keeping the temperature of the mixture at 3° C. The mixture is neutralised by adding 1 part of sodium carbonate and the neutral mixture is then added slowly to a stirred mixture of sodium cuprocyanide and toluene at 5° C. After stirring for 24 hours at room temperature the mixture is extracted with toluene, the toluene extract is washed with hydrochloric acid, water and dried, and the solvent is then removed by distillation. The residue is fractionally distilled under reduced pressure and the fraction boiling at 175° C./15 mm. is crystallised from petroleum ether giving 2-(p-fluorophenyl)benzonitrile, M.P. 73–74° C.

*Example 28*

A mixture of 1 part of 2-(p-bromophenyl)benzoic acid, 1 part of phosphorus pentachloride and 0.5 part of phosphorus oxychloride is heated at 100° C. for 15 minutes, cooled, diluted with petroleum ether (B.P. 60–80° C.) and the mixture stirred with concentrated ammonia solution (density=0.88) with cooling. The mixture is filtered, the solid washed with water and crystallised from methanol giving 2-(p-bromophenyl)benzamide, M.P. 172–173° C.

The 2-(p-bromophenyl)benzoic acid used in the above procedure may be obtained by heating a mixture of 2 parts of 2-phenylbenzoic acid, 20 parts of glacial acetic acid, 1.5 parts of bromine and a crystal of iodine at 100° C. for 18 hours. The acetic acid is removed by distillation under reduced pressure whereafter the residue is washed with petroleum ether (B.P. 40–60° C.) and the residue crystallised from benzene giving 2-(p-bromophenyl)benzoic acid, M.P. 169–170° C.

*Example 29*

A mixture of 1.5 parts of 2-(p-bromophenyl)benzoic acid, 2 parts of phosphorus pentachloride and 0.5 part of phosphorus oxychloride is heated at 100° C. for 5 minutes. The phosphorus oxychloride is removed by distillation under reduced pressure and the residue is dissolved in benzene, the solution is cooled and saturated with gaseous methylamine. The mixture is evaporated to dryness under reduced pressure, whereafter the residue is washed with water and crystallised from methanol giving 2-(p-bromophenyl)-N-methylbenzamide as colourless plates, M.P. 150–151° C.

*Example 30*

2.3 parts of 2-(p-bromophenyl)benzamide and 15 parts of acetyl chloride are heated under reflux at 100° C. for 24 hours. The mixture is filtered and the filtrate is evaporated to dryness. The residue is extracted with petroleum ether (B.P. 40–60° C.) and the residue is crystallised from petroleum ether (B.P. 80–100° C.), giving 2-(p-bromophenyl)-N-acetylbenzamide, M.P. 150–151° C.

*Example 31*

A mixture of 1.5 parts of 2-(p-iodophenyl)benzoic acid, 2 parts of phosphorus pentachloride and 5 parts of dry benzene is heated at 100° C. for 1 minute, cooled and then diluted with 50 parts of dry ether. The solution is cooled and saturated with gaseous ammonia. The mixture is filtered, the solid residue washed with water and crystallised from methanol giving 2-(p-iodiphenyl)benzamide as colourless needles, M.P. 192–193° C.

The 2-(p-iodophenyl)benzoic acid used in the above procedure may be obtained by adding a hot solution of 5.8 parts of 2-iodofluorenone in 55 parts of diphenyl ether to a stirred mixture of 10 parts of potassium hydroxide in 75 parts of diphenyl ether at 180° C. and maintaining this temperature for 5 minutes. The mixture is cooled to 70° C. and 70 parts of water added. The mixture is stirred for 10 minutes and the aqueous layer is then separated. The aqueous solution is acidified with hydrochloric acid, the mixture filtered and the solid residue is crystallised from aqueous methanol, giving 2-(p-iodophenyl)benzoic acid, M.P. 192–193° C.

*Example 32*

A mixture of 20 parts of 2-(p-fluorophenyl)-5-fluorobenzonitrile and 600 parts of 90% sulphuric acid (w./w.) is heated at 90–95° C. for 1.5 hours. The mixture is cooled to 25° C., poured on to 1600 parts of ice and filtered. The solid residue is washed until free from acid and then dried. There is thus obtained 2-(p-fluorophenyl)-5-fluorobenzamide, M.P. 133–134° C.

*Example 33*

The procedure described in Example 26 is repeated except that the 1.3 parts of 2-(o-iodophenyl)benzoic acid are replaced by 1.3 parts of 2-(o-chlorophenyl)benzoic acid. There is thus obtained in a similar manner 2-(o-chlorophenyl)benzamide monohydrate as colourless needles, M.P. 64–65° C. after crystallisation from aqueous ethanol.

*Example 34*

The procedure described in Example 26 is repeated except that the 1.3 parts of 2-(o-iodophenyl)benzoic acid are replaced by 2.0 parts of 2-(o-bromophenyl)benzoic acid. There is thus obtained in a similar manner 2-(o-bromophenyl)benzamide, M.P. 112° C. after crystallisation from benzene.

*Example 35*

A suspension of 1.7 parts of 2-(o-chlorophenyl)-5-bzromobenzoic acid and 2 parts of phosphorus pentachloride in 5 parts of dry benzene is allowed to stand at room temperature until all the acid has dissolved. The mixture is then heated at 100° C. for 5 minutes, cooled and diluted with petroleum ether (B.P. 60–80° C.). Dry gaseous ammonia is passed into the solution until the solution is alkaline, and the mixture is then filtered. The solid residue is washed with water, dried and then crystallised from methanol giving 2-(o-chlorophenyl)-5-bromobenzamide, M.P. 159–160° C.

The 2-(o-chlorophenyl)-5-bromobenzoic acid used in the above procedure may be obtained as follows:

A mixture of 53 parts of methyl 2-iodo-5-bromobenzoate and 60 parts of o-iodochlorobenzene is heated at 254° C. (internal temperature) while 30 parts of copper bronze are added over a period of 15 minutes. After heating at 254° C. for 3 hours the mixture is cooled, extracted with benzene and the benzene extracts are evaporated to dryness. The residue is fractionally distilled under reduced pressure and a fraction of B.P. 165–200° C./0.2 mm., which contains ethyl 2-(o-chlorophenyl)-5-bromobenzoate and dimethyl 4:4'-dibromo diphenate, is collected. The mixture of esters (30 parts) is dissolved in 200 parts of ethanol and heated under reflux with 60 parts of a 40% solution of sodium hydroxide for 12 hours. The ethanol is removed by distillation, the residue dissolved in water and the solution extracted with chloroform. The aqueous alkaline solution is separated and made acid to litmus with acetic acid. The aqueous acidic mixture is extracted with chloroform and the chloroform solution is repeatedly extracted with sodium hydrogen carbonate solution until the aqueous extracts give no precipitate on acidification with hydrochloric acid. The combined aqueous extracts are acidified with hydrochloric acid, the mixture filtered and the residue is crystallised from aqueous ethanol (1:1) giving colourless needles of 2-(o-chlorophenyl)-5-bromobenzoic acid, M.P. 178–179° C.

What I claim is:
1. A 2-phenylbenzamide derivative of the formula:

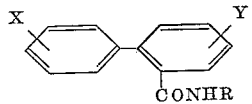

wherein R is selected from the group consisting of hydrogen, the carbamyl radical —$CONH_2$, lower alkyl and alkanoyl of not more than 4 carbon atoms, and X and Y are halogen atoms.

2. The compound 2-(p-bromophenyl)-4-bromobenzamide.
3. The compound 2-(p-bromophenyl)-5-chlorobenzamide.

References Cited in the file of this patent
UNITED STATES PATENTS

| | | |
|---|---|---|
| 2,025,587 | Haller et al. | Dec. 24, 1935 |
| 2,729,678 | Sahyun et al. | Jan. 3, 1956 |
| 2,744,916 | Sahyun et al. | May 8, 1956 |
| 2,751,410 | Sahyun et al. | June 19, 1956 |
| 2,773,096 | Sahyun et al. | Dec. 4, 1956 |

OTHER REFERENCES

Graebe et al.: Annalen der Chemie, vol. 279 (1894), pp. 261–5.

Schonberg.: Berichte, vol. 48 (1925), pp. 580–586 (page 586 relied on).

Huntress et al.: J. Am. Chem. Soc., vol. 61, pages 816–822, page 816 relied on (1939).

Degering: Outline of Org. Nitrogen Compounds (1945), pp. 397; 399–401.

Hackh's Chemical Dictionary, published by the Blakiston Co. (Philadelphia) (1944), pp. 71, 74, 78.

Finholt et al.: "Journal Inorganic and Nuclear Chemistry," vol. 1, pages 317–18 (1955).

Jules et al.: "Journal of the American Pharmaceutical Association" (Scientific Edition), vol. 45, pages 277–281 (1956).

Buu-Hoi et al.: "Journal Organic Chemistry," vol. 22, pages 668–671 (1957).